June 30, 1970  W. P. KUSHMUK ET AL  3,517,558
WHEEL SUPPORT FOR BALANCER
Filed Feb. 20, 1967  4 Sheets-Sheet 1
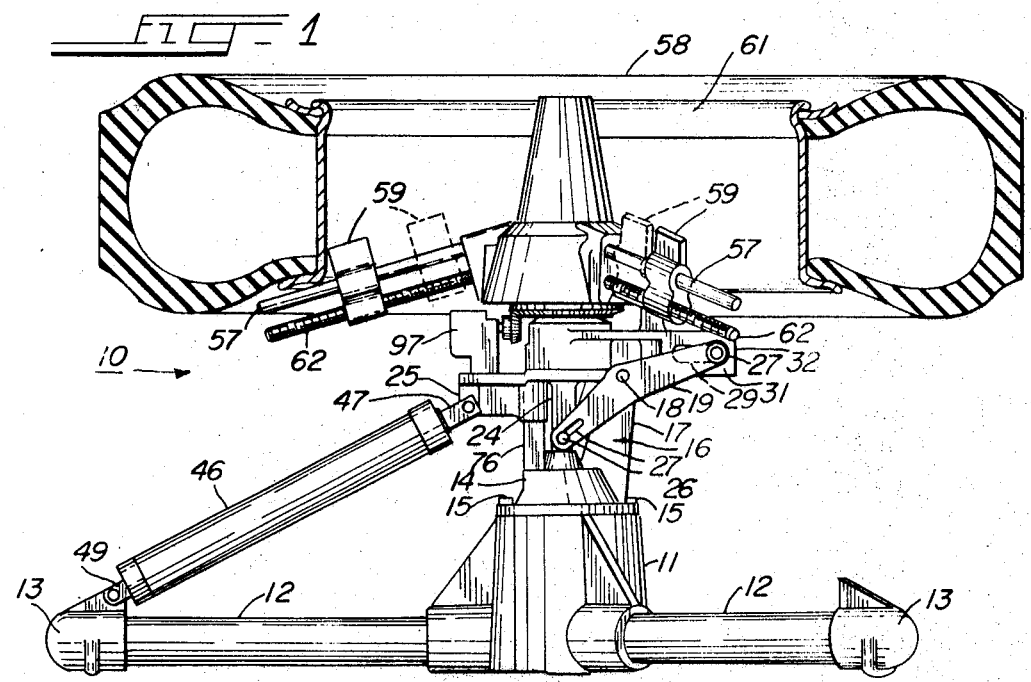
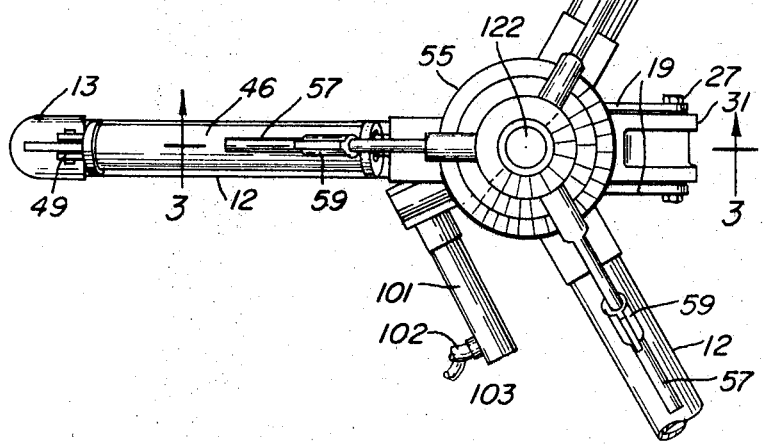
INVENTORS.
WALTER P. KUSHMUK
LEO C. BOGAERTS
BY

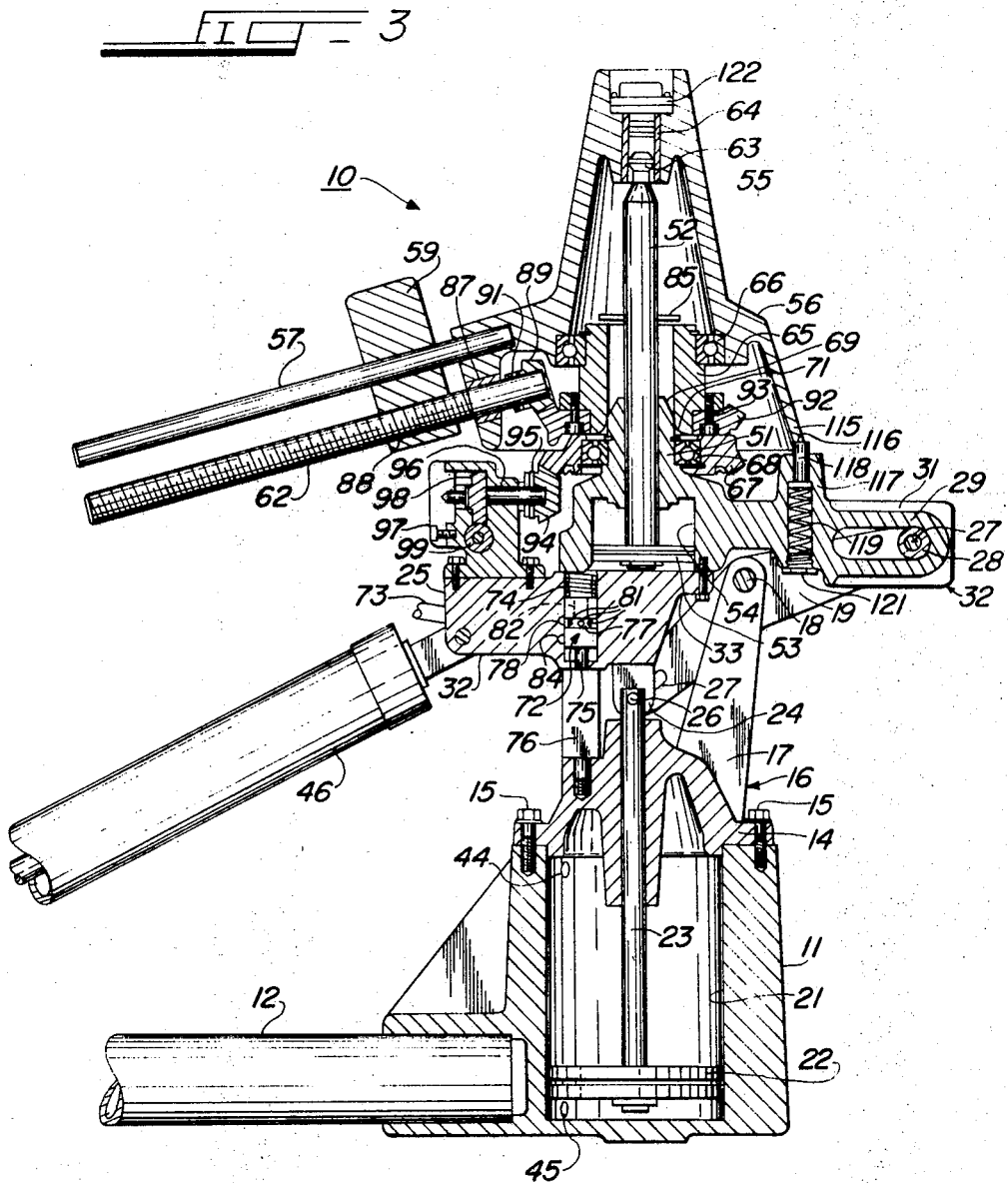

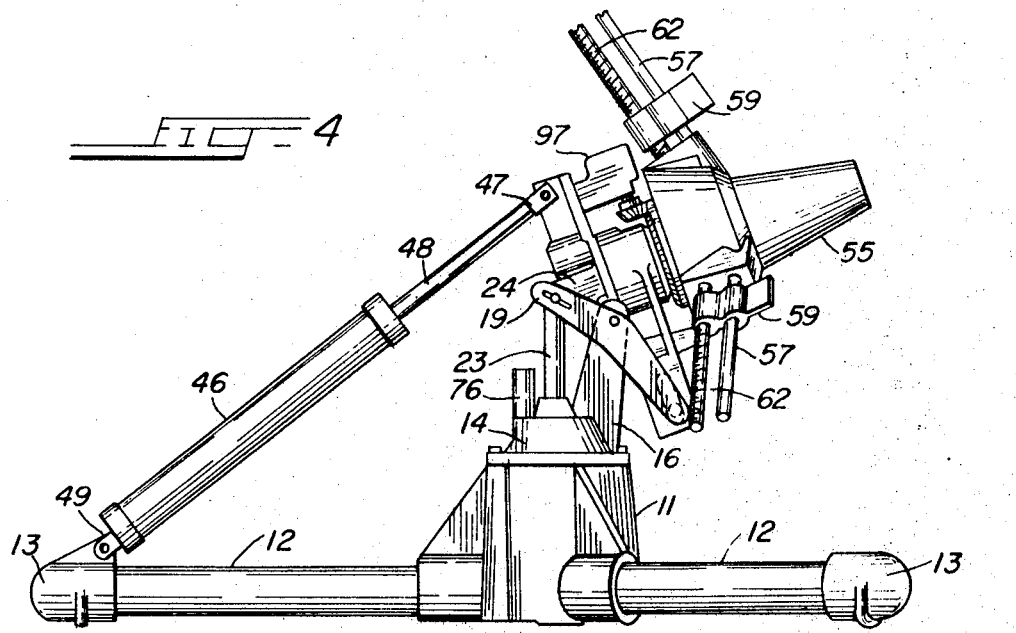
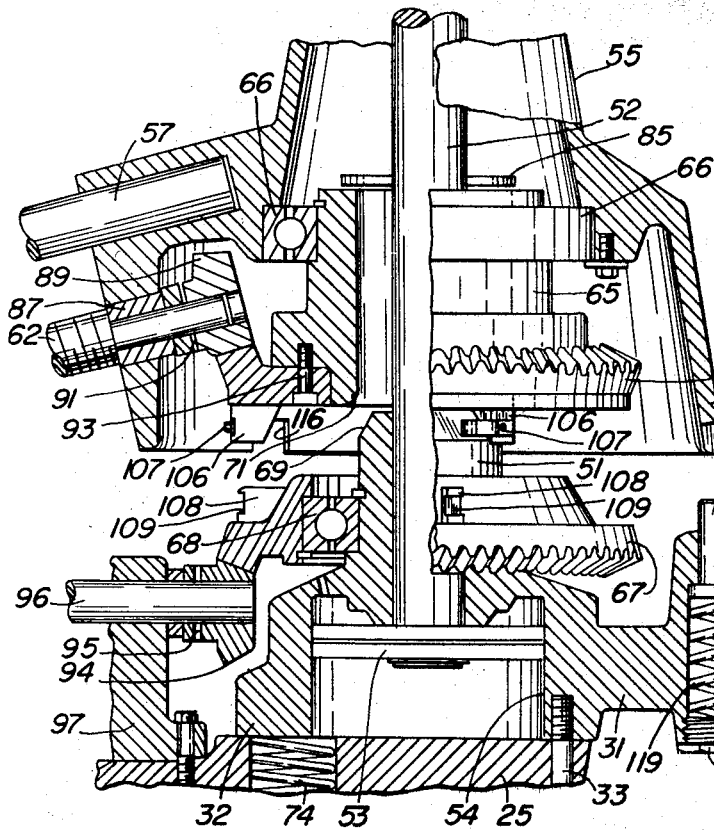
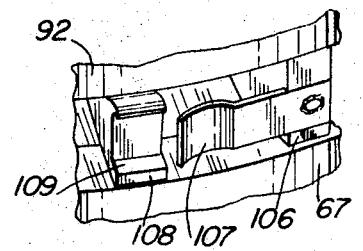
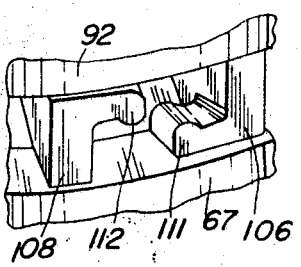

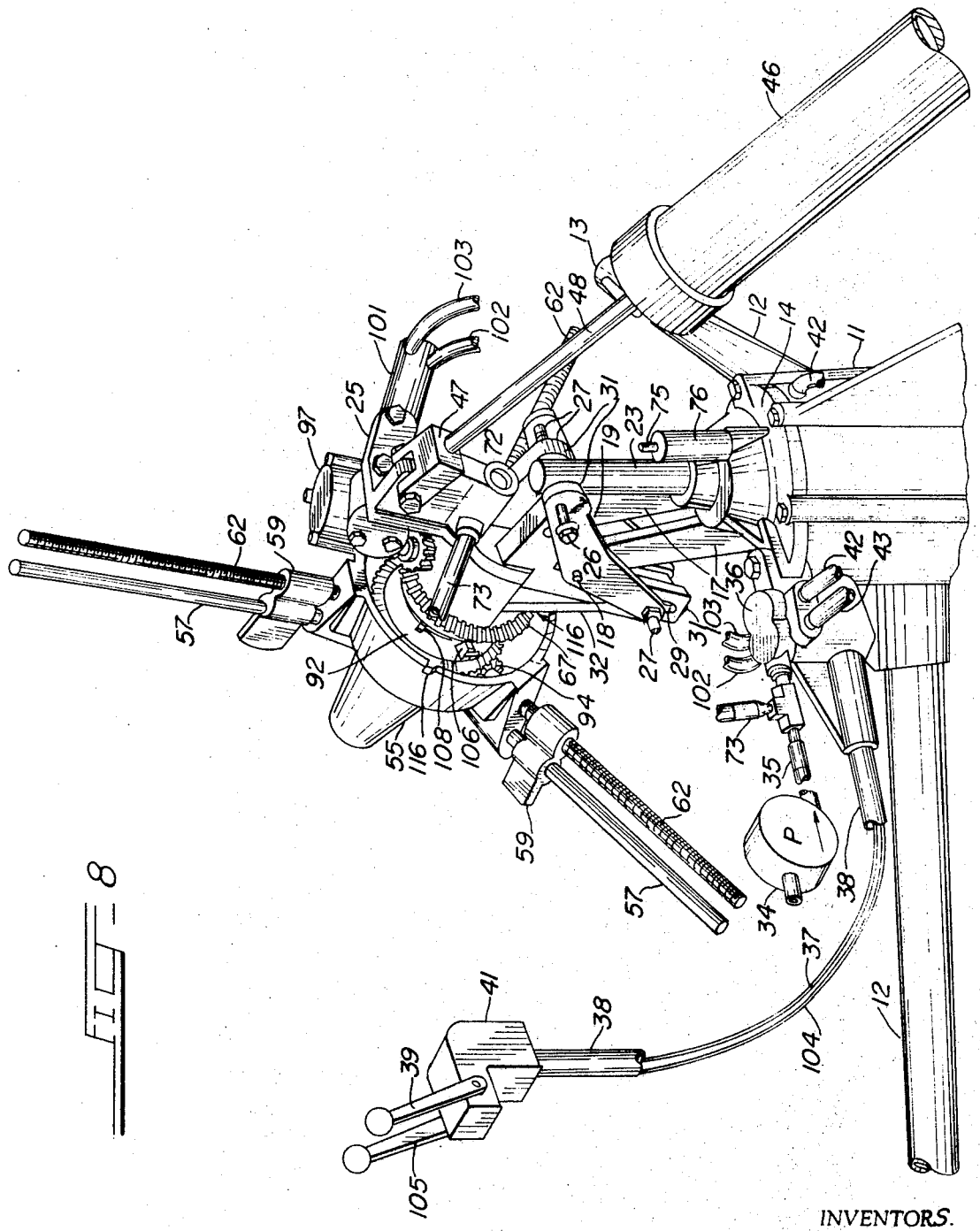

United States Patent Office 3,517,558
Patented June 30, 1970

3,517,558
WHEEL SUPPORT FOR BALANCER
Walter P. Kushmuk, Niles, and Leo C. Bogaerts, Antioch, Ill., assignors to Ammco Tools, Inc., North Chicago, Ill., a corporation of Illinois
Filed Feb. 20, 1967, Ser. No. 617,317
Int. Cl. G01m 1/14
U.S. Cl. 73—485         6 Claims

ABSTRACT OF THE DISCLOSURE

A heavy wheel is supported about a pivot bearing by wheel support arms that slant downward from a balancing head member and lie in the surface of an imaginary cone so that larger wheels rest at a lower location than smaller wheels. The wheels are automatically raised into position and clamped in place.

---

The present invention relates to static wheel balancing equipment and more particularly to a new and improved static wheel balancing machine particularly adapted for balancing wheels used on trucks and other large vehicles, which wheels are of substantially greater size and weight than conventional automobile wheels.

A widely used type of static wheel balancer comprises a wheel supporting member horizontally balanced on a stationary vertical pedestal and adapted to support a wheel, including a tire, in concentric relation to the pivot point on which the wheel and its supporting member are free to pivot out of a horizontal plane in any direction. Accordingly, if the wheel is not statically balanced, the heaviest side will tilt downwardly. To properly balance the wheel, the operator observes the extent and direction of downward tilting of one side of the wheel, as indicated by a spirit level or similar means, and applies appropriate weights to the opposite side of the wheel until it assumes a horizontal position, thereby indicating that the wheel is in static balance.

While prior machines of this type are quite suitable for balancing conventional automobile wheels, a number of problems are presented when such machines, or simply enlarged versions thereof, are used for balancing substantially larger wheels, which, in the case of wheels used on heavy trucks and similar vehicles, may weigh as much as 800 pounds or more.

As a general proposition, the maximum amount by which a wheel might normally be out of balance is proportional to the size of the wheel. However, since smaller wheels normally experience higher rotational speeds than do larger wheels, the former generally must be balanced more precisely than the latter in order to operate satisfactorily. Therefore, a balancing device intended for balancing wheels of various sizes should be more sensitive to tilting when a relatively small wheel is being balanced than when a larger wheel is mounted thereon so that the amount by which the wheel can deviate from a horizontal plane while still pivotally balanced will correspond generally to the range if imbalance normally encountered. In other words, if the wheel support member approaches its maximum tilted position when a badly out-of-balance relatively small wheel is supported thereon, even a moderately unbalanced significantly larger wheel will tilt the same support member beyond its range of free pivotal movement, whereby the tilting angle is no longer indicative of the amount of weight to be applied to correct the balance of the wheel. To resolve this problem, still another important object of the invention is to provide a static wheel balancer with means for correlating automatically the tilting sensitivity of the wheel support member to the size of the wheel being balanced. This object is accomplished by supporting the wheel on support surfaces of the wheel support member defined by an imaginary vertical cone, with the pivot point of the balance member at the axis of the cone above the wheel support surfaces, whereby larger wheels will be supported in a lower position relative to the pivot point than will smaller wheels.

To achieve meaningful results, the wheel being balanced must be mounted on the wheel support member in accurate coaxial alignment with the pivot member by which it is supported. Furthermore, the wheel must be clamped securely in that position to prevent it from shifting on the support member as balance weights are applied thereto, which generally involves hammering such weights onto the wheel rim. Therefore, an object of the invention is to incorporate in such a balancing machine simple, rugged and easily operable means for accurately positioning and positively clamping any one of a number of wheels of various sizes in concentric relation to the wheel support member.

A further object of the invention is to reduce the size of the power means associated with the wheel positioning and clamping means by employing an impact mechanism for releasing such clamping means.

These and other important objects of the invention will be apparent from the following detailed description taken in connection with the accompanying drawings wherein like reference numerals refer to like elements and in which:

FIG. 1 is a side elevational view of a wheel balancer constructed in accordance with the present invention, with a wheel, shown in cross section, supported on the wheel support member in a horizontal position;

FIG. 2 is a partial top plan view of the machine shown in FIG. 1;

FIG. 3 is a partial vertical sectional view of the machine shown in FIGS. 1 and 2 taken along the line 3—3 of FIG. 2;

FIG. 4 is a side elevational view, corresponding to FIG. 1, showing the wheel support member in its loading position with the wheel clamping jaws in retracted position;

FIG. 5 is an enlarged vertical sectional view corresponding generally to a portion of FIG. 3 but showing the relation of the internal components of the wheel balancing member in the relative positions which they assume when that member is raised out of engagement with the supplemental supporting means to the position in which the balancing operations are performed;

FIG. 6 is an enlarged partial perspective view of the power transmitting lugs illustrated in FIG. 5;

FIG. 7 is an enlarged partial perspective view of an alternative form of power transmitting lugs; and FIG. 8 is a partial perspective view of the machine with the wheel support member in its loading position as illustrated in FIG. 4.

As is best shown in FIGS. 1, 2 and 3, the wheel balancing machine 10 comprises a generally cylindrical base cylinder 11 adapted to rest on the floor and supported against tilting by three radial legs 12 extending outwardly from the base member and terminating in floor-engaging cap members 13. A cylinder head member 14, attached to the top of the base cylinder 11 by a plurality of bolts 15, includes a vertical support structure 16 comprising a pair of parallel, vertically extending arms 17 provided at their upper ends with aligned holes adapted to receive a main pivot rod 18. A pair of parallel spaced transfer links 19 are pivotally supported adjacent the opposite sides of the vertical support structure by the pivot rod 18. Within the internal bore 21 of the base cylinder, as shown in FIG. 3, a lower piston 22 is attached to a vertical piston rod 23 which extends upwardly through the cylinder head member 14. At the upper end of the piston rod 23 a pair of depending support legs 24 of tilting base member 25 straddle the rod and are pivotally secured thereto by a gudgeon pin 26, the opposite ends of which are received in a pair of slots 27 respectively provided in the transfer links 19 which are disposed outwardly of the adjacent legs 24. At their opposite ends the transfer links 19 are joined together by a roller shaft 27 which supports a roller 28 (FIG. 3) received within an elongate opening 29 extending through a pair of outwardly extending arms 31 of a pedestal support member 32. The member 32 is attached to the tilting base member 25 by a plurality of bolts, one of which is shown in FIG. 3 at 33. Accordingly, when the vertical piston rod 23 is raised, as described hereinafter, the tilting base member 25 assumes the position shown in FIGS. 4 and 8, by reason of the vertical movement of gudgeon pin 26 and the resulting downward arcuate movement of roller 28 supported by the transfer links 19. Similarly, when the piston rod 23 is returned to its former lower position, the tilting base member 25 reassumes the position shown in FIGS. 1, 2 and 3. This mechanism permits a wheel to be loaded on a wheel balancing machine by being leaned thereagainst in a substantially vertical position to be moved by the wheel balancing machine to a horizontal position in which the balancing operation is performed. It is described and claimed in the copending U.S. application Ser. No. 617,095, to Walter P. Kushmuk et al., entitled "Wheel Balancer Tilting Mechanism," now Pat. No. 3,483,757, and assigned to the same assignee as this application.

To raise and lower the piston rod, a source of compressed air, shown schematically at 34 in FIG. 8, is connected by an air line 35 to a piston controlling valve, not shown, located in valve body 36. The piston controlling valve is movable by a flexible "push-pull rod 37 extending through a curved rigid tube 38 and connected to a control handle 39 on control box 41 supported by the tube. By this arrangement, movement of the control handle 39 moves the piston controlling valve to admit compressed air, selectively either to the top or bottom of the base cylinder through the air hoses 42 or 43 which communicate respectively with ports 44 and 45 respectively opening into the cylinder 21 near the top and bottom thereof, and, simultaneously, to exhaust air from the opposite end of the cylinder. In order to insure that the tilting base member 25 is moved smoothly and steadily by the piston rod 23 regardless of the weight of the wheel on the machine or fluctuations in air pressure, and to prevent possible damage to the machine by sudden gravitational movement of the tilting head if the air pressure should accidently be lost, a hydraulic damper 46, similar to an automotive shock absorber, is attached at its upper end to the tilting base member 25 by a clevis 47 on slidable rod 48 (FIG. 4), and, at its lower end, is connected by a similar clevis 49 on the damper cylinder to the leg cap member 13 aligned therewith.

Referring now particularly to FIG. 3, the pedestal support member 32 includes as an integral part thereof a vertical sleeve 51 slidably supporting a pedestal shaft 52, provided at its lower end with a piston 53 axially movable within a cylinder bore 54 in the pedestal support member 32. The wheel support member, indicated generally by the numeral 55, comprises a balancing head member 56 provided with three uniformly spaced radial wheel support arms 57 adapted to support a wheel as shown at 58 in FIG. 1. The wheel is retained on the support arms 57 in concentric relation with the wheel support member 55 by means of three jaws 59, which are movable simultaneously along the respective support arms 57 and into engagement with the wheel rim 61 by means of a plurality of screw rods 62 respectively disposed below and aligned with the arms 57. The operation of this portion of the machine is hereinafter described.

During the actual wheel balancing operation, the pedestal shaft 52 is raised by the piston 53 from the position shown in FIG. 3 to an elevated position wherein the wheel support member is supported completely out of engagement with other elements of the machine by a pivot structure of a type disclosed in U.S. Pat. No. 3,204,465 issued on Sept. 7, 1965. This pivot structure comprises a pivot piston 63 mounted to the top end of the pedestal shaft 52 and received in a pivot cylinder 64 secured in the wheel support member 55. The pivot piston 63 is so shaped as to engage the cylinder in substantial line contact therewith, whereby the cylinder can tilt relative to the pedestal shaft without resulting in loss of a quantity of oil or other fluid, which is trapped in cylinder 64 above the piston to provide a rugged and substantially frictionless fluid pivot bearing for the wheel support member.

In order to prevent damage to the pivot structure when a wheel is loaded onto the machine or removed therefrom, and during movement of the wheel support member by the previously described movement of the tilting base member, the pedestal shaft 52 remains in its lowered position, shown in FIG. 3, during these operations. In such lowered position, a heavy internal sleeve member 65, rotably supported in the balancing head member 55 by a ball bearing 66, snugly receives the top end of the vertical sleeve portion 51 of the pedestal support member 32 and rests on the adjacent top surface of a lower ring gear 67, the function of which will be later described, which is rotatably supported on the sleeve portion 51 by a second ball bearing 68. To facilitate the reception of the sleeve portion 51 into sleeve member 65, the sleeve portion is tapered at its top end as shown at 69, and the sleeve member 65 is provided with an adjacent rounded internal shoulder, indicated by numeral 71. Accordingly, when the wheel support member 32 is in this relation to the pedestal support member 25, it is rigidly supported against tilting movement relative to the pedestal shaft.

For the purpose of insuring that the wheel support member 55 will assume and remain in its rigidly supported lower position while it is in its tilted loading position and during movement of the tilting base member, the admission of air to the lower end of the cylinder bore 54, to raise the pedestal shaft, is regulated by a spring loaded control valve 72, communicating with the compressed air source through an air hose 73. When the tilting base member assumes the horizontal position shown in FIG. 3, the valve 72 is moved relative to member 25 to its raised position, against the influence of spring 74, by means of a vertical pin 75 disposed at the top of a support rod 76, which rod 76 serves to support the tilting base member 32 in its horizontal position. Such movement of the valve 72 aligns the annular groove 77 thereof with a port 78, communicating with the air supply hose 73, thereby admitting air to the lower end of the cylinder through holes 81 and a central bore 82 in the valve member. In view of this explanation, it will be appreciated that FIGS. 1, 2 and 3 are merely illustrative, inasmuch as the pedestal shaft would actually have started to raise by the time the tilting base member had assumed the position illustrated in those figures. As soon as the tilting base member is tilted by the piston rod 23 out of engagement with the support shaft 76, the valve 72 is moved by the spring 74 to a position in which the air inlet port 78 is blocked and in which the air beneath the piston 53 is ported to the atmosphere through an air exhaust port 84, thereby allowing the wheel support member to reassume its lower position under the influence of gravity. A pin 85, extending through the pedestal shaft 52 above sleeve 65, serves to prevent the wheel support member from being lifted accidently above the position in which pivot piston 63 is received within cylinder 64, which would result in the loss of the fluid from the cylinder. Also, if desired, a compression spring may be provided above piston 53 in the pedestal support member to supplement the effect of gravity in returning the wheel balancing member to its lower position, in which case, the pin 85 would also serve to move the wheel support member downwardly.

As previously mentioned, the subject wheel balancing machine 10 also includes power operated means for moving the wheel engaging jaws 59 selectively into and out of engagement with a wheel supported by the support arms. As is most clearly shown by FIGS. 3 and 5, this is accomplished by means of the screw members 62 rotatably supported below and in parallel relation to the support arms 57 by a plurality of bushings 87 in the balancing head member 55 and in engagement with associated threaded holes 88 in the jaw members 59. The inner end of each of the screw members 62 is provided with a driven pinion gear 89 attached thereto by a pin 91 and in meshing engagement with an upper ring gear 92. The gear 92 is bolted to the rotatable sleeve member 65 as shown at 93, thus allowing the upper ring gear 92 to rotate relative to the head member 56. Therefore, assuming that the screw members 62 are provided with right-hand threads and that the jaws 59 are positioned at equal distances from the arms of the wheel support member 55 during its assembly, it is apparent that rotation of the upper ring gear 92 in a clockwise direction, as viewed from the top, will cause the jaws 59 simultaneously to move outwardly on the support arms 57 while remaining in equally spaced relation relative to the axis of the head member 55. Accordingly, when a wheel is positioned on the support arms, clockwise rotation of the gear 92 will bring the jaws 59 into contact with the inner surface of the wheel rim, which will thereby be shifted into concentric relation to the wheel support member 55 and clamped thereto. Similarly, when the upper ring gear 92 is rotated in a counterclockwise direction relative to the head member, the jaws 59 will move simultaneously inwardly to disengage the wheel rim.

It should also be noted that the wheel support arms slant downwardly from the balancing head member. By this arrangement, since a larger wheel will be supported further out on the support arms than a smaller one, its center of mass will be located correspondingly lower than that of a smaller wheel relative to the pivot structure supporting the head member. Therefore, an unbalanced larger wheel will tilt the head member less than will a smaller wheel which is out of balance by the same amount, whereby the tilting sensitivity of the wheel support member varies automatically in accordance with the size of the wheel being balanced on the machine.

To impart rotational movement to the upper ring gear 92 to move the clamping jaws 59 as heretofore described, the lower ring gear 67 is meshed with a driving pinion gear 94 attached by a pin 95 to a shaft 96 rotatably supported in a gear reduction box 97 on the tilting base member 32. At its opposite end, the shaft 96 is affixed to a worm wheel 98 in engagement with a worm gear 99 rotatably driven by a reversible air motor 101, which, as shown in FIG. 8 is connected by a pair of air hoses 102 and 103 to a motor control valve included in valve body 36 and operated by a second flexible rod 104 connected to the control handle 105. By this means, movement of the control handle 105 in one direction from a central "off" position causes the air motor 101 to drive the lower ring gear 67 in a clockwise direction, whereas movement of the handle 105 in the opposite direction causes the lower ring gear 67 to be rotated in a counterclockwise direction.

FIGS. 5 and 6 best illustrate the means employed to provide driving engagement between the upper and lower ring gears. This means comprises three depending lug members 106 on the upper gear member 92, radially spaced 120 degrees apart, and each including a tangentially extending spring clip member 107. The lower ring gear 67 is provided with three corespondingly positioned upstanding lugs 108, each of which is notched at its outer edge, as shown at 109.

When the wheel supporting member in its raised position as shown in FIG. 5, at which time a wheel is presumably clamped there on, the two ring gears are completely independent of one another and, if the lower ring gear 67 is rotated, such rotation will not influence the upper ring gear 92 or any other component in the wheel support member. However, when the wheel support member 55 is lowered to the position shown in FIG. 3 in response to tilting of the tilting base member 32, the upper ring gear 92 moves into adjacent relation with the lower ring gear, whereby the respective driving lugs are in a common plane. If it should happen that the lugs are exactly aligned when the head support member is lowered, the depending gear lugs may rest against the top surfaces of the upstanding ones, preventing complete lowering of the head member. However, as soon as the lower ring gear 67 is rotated, the inertia of the wheel support member 55 will cause the lugs to move out of supporting engagement so that the upper ring gear 92 can drop further to the illustrated position. Accordingly, when the lower ring gear 67 rotates in a counterclockwise direction, viewed from the top, the upstanding lugs 108 move into abutting relation with the depending lugs 106 to impart corresponding counterclockwise movement to the upper ring gear 92 to withdraw the clamping jaws from engagement with the wheel. When the lugs 106, 108 are in such abutting relation, each of the spring clips 107 is received in one of the notches 109 of the adjacent lugs 108, thereby resiliently holding the lugs in adjacent relation and preventing the head member from being raised so long as the lugs remain so engaged.

As alternatives to this spring clip arrangement, the lugs may be provided with cooperating ears as shown at 111 and 112 in FIG. 7, or with other similarly cooperating means such as a pin on one of the lugs aligned with a pin receiving hole or slot in the adjacent lug. Any of such arrangements serve to prevent movement of the upper gear away from the lower gear when the lugs are engaged to unlock the jaw members. Actually, as previously described, the tilting base member has been tilted out of the position shown in FIG. 3 before the engagement of the lugs takes place, but the relative positions of the gears and other elements remains the same as illustrated. Even if the wheel supporting member is tilted all the way to its loading position before the air motor is actuated, the pedestal shaft still slopes sufficiently to cause the head member 55 to be gravitationally urged toward the tilting base member 32 whereby the lugs will engage even if they should happen to be in supporting relation to one another. When the machine is operated in the preferred manner, however, the jaw unclamping operation is commenced as soon as the pedestal is lowered in response to tilting of the base member and is completed before the wheel support member reaches its loading and unloading position.

For the counterclockwise rotation of the upper ring gear to move the jaws 59 inwardly, it is essential that the wheel support member 55 itself be prevented from rotating. This is accomplished by providing a skirt portion 115 of the balancing head member 55 with three notches, as shown at 116, each of which is centrally located between two of the wheel support arms. When the head member 55 is moved to its lowered position in which the ring gear lugs 106, 108 are in cooperative alignment, the lower edge of the skirt 115 is immediately adjacent a boss 117 on the outwardly extending arm 31 of the pedestal support member 32. A slidable pin 118 extends upwardly through the boss and is urged resiliently toward the position shown in FIG. 5 by a spring 119 supported at it lower end by a threaded plug 121. If none of the notches happens to be aligned with pin 118 when the balancing head member is moved to its lowered position, the pin 118 is depressed by the skirt portion 115 of the head member.

When the air motor is actuated, however, greater force is required to move the jaws than to rotate the wheel support member. Therefore, the latter member will rotate until one of the notches 116 moves into alignment with the pin 118, which pin will thereupon enter the aligned notch 116 and block further rotation of the wheel support member, whereby the rotative force of the air motor 101 is transmitted entirely to the screw shafts to unclamp the jaw members 59 from the wheel rim and to move them inwardly until the motor is stopped by the operator, or is stalled when the jaws reach the inward ends of the screw shafts.

When the jaws 59 have thus been released and the wheel support member 55 tilted to its loading-unloading position, the wheel rests on the floor and is supported by leaning against the support arms which, due to the location of the notches 116, are in the position shown in FIGS. 4 and 8, with one support arm pointing upwardly. The wheel is then removed from the machine and another wheel is similarly positioned by leaning it against the three support arms, such operation being facilitated by the previously mentioned position in which the arms are located. When the operator then moves the control handles to clamp and raise the wheel, the vertical piston rod 23 moves the tilting base member 32 back to its horizontal position, and, simultaneously, the air motor 101 is actuated to drive the lower ring gear 67 in a clockwise direction. Such movement of the lower ring gear 67 disengages the lugs from their previous laterally abutting and interlocking relation with one another, and allows the lower gear 67 to rotate relative to the upper gear 92 to re-engage the lugs by abutment of the side surfaces thereof opposite those which were previously in contact, thereby imparting clockwise rotation to the upper gear 92. Since the head member is still prevented from rotating by pin 118, the clockwise rotation of the upper ring gear, imparted thereto by the re-engaged lugs, rotates the screw shafts 62 to move the jaws 59 outwardly until the motor 101 is again stalled when the jaws have centered the wheel and tightly clamped it to the support arms 57. By the time the tilting base member 32 has tilted sufficiently to actuate the control valve 72, the clamping operation has been completed. Hence, when the valve 72 is actuated, the pedestal shaft 52 is raised by the piston 53 to disengage the ring gears 67, 92 and the rigid support means comprising the sleeves 51 and 65, whereby the wheel is tiltably supported solely by the pivot structure and is ready to be balanced by adding appropriate weights until the wheel assumes a horizontal plane as indicated by a spirit level 122 mounted at the top of the balancing head member.

As the clamping jaws 59 are moved outwardly into engagement with the wheel rim, considerable rotational inertia is developed in the various rotating elements of the jaw moving assembly. Therefore, when the jaws firmly engage the rim, the kinetic energy of the various rotating elements causes the jaws to clamp the rim with considerably more force than that which could be produced simply by the torque exerted by the air motor. Accodlingly, the torque exerted by the motor may be insufficient to release the jaws when the motor is actuated in the opposite direction under maximum load. This problem is overcome, however, by the fact that, when the air motor 101 is reversed to unlock the jaws 59, the lower ring gear 67 rotates before bringing the upstanding lugs 108 thereon into unclamping engagement with the depending lugs 106 on the upper ring gear 92, whereby the inertia built up in the motor and the lower ring gear 67 produces an intertial impact when the lugs re-engage, thus breaking the jaws 59 free of the wheel rim. While the illustrated construction employs three lugs or dogs on each gear, it should be understood that a single lug on each gear could accomplish the same objective or that more than three pairs of lugs could be utilized, provided that the lugs were sufficiently spaced to allow relative movement between the gears so that the lower gear could still impart inertial impact to the upper one.

While the foregoing explanation describes many novel features cooperating in the illustrated balancing machine, it should be understood that many such features could be incorporated benefically in a different and perhaps simpler machine. For example, the sensitivity compensating feature provided by the downwardly sloping wheel support arms could be adapted even to simple balancing machines, devoid of power operated structure and employing a fixed vertical support pedestal. Similarly, the illustrated machine might be adapted for manual rather than power operation, whereby the wheel support member would be raised manually from the loading position to its horizontal position and thereafter to the balancing position, thus requiring manual effort, which could be minimized by appropriate counterbalancing means, but eliminating actual lifting of the wheel.

Since these and other modifications and alternatives are possible without departing from the spirit of the invention, the foregoing description is to be considered as illustrative only and not as limiting the scope of the invention as defined by the appended claims.

We claim:
1. A device for balancing a wheel, said device comprising
   a wheel support member including a pivot member,
   a base member for supporting said wheel support member in balancing fashion thereon by means of said pivot member,
   a plurality of jaw members mounted on said wheel support member for mutual radial movement relative to an axis through said pivot member,
   guide means preventing rotation of said jaw members on said support member,
   a plurality of first gears journaled in said wheel support member,
   means in operative engagement with respective ones of said jaw members and said gears whereby rotation of said gears move said jaws in the radial directions,
   a second gear member journaled in said wheel support gears,
   a rotatable driving member below and in coaxial relation with said second gear member,
   reversible driving means for selectively imparting rotational movement in either direction to said rotatable driving member,
   clutch means for releasably engaging said rotatable driving member with said second gear member, and
   blocking means for preventing rotation of said wheel support member relative to said base member during engagement of said driving member with said second gear member by said clutch means.

2. A wheel balancing machine according to claim 1 in which said clutch means comprises:
   (a) an upstanding lug on said rotatable driving member; and
   (b) a depending lug on said second gear member, said depending lug being out of engageable relation with said upstanding lug when said wheel support member is in said raised position and in laterally engageable relation therewith when said wheel support member is in said lowered position, whereby rotational movement of said driving member is imparted by said lugs to said second gear member when said wheel support member is in said lowered position.

3. A construction according to claim 2 in which said depending and upstanding lugs occupy such relatively narrow quadrants of opposed circular areas of said driving and second gear members that said driving member is rotatively movable relative to said second gear member without imparting rotation thereto while said lugs are in engageable relation, whereby such movement of said driving member transmits inertial impact to said second gear member upon engagement of said lugs.

4. A construction according to claim 2 in which said lugs are provided with cooperating locking means for preventing said wheel balancing member from being moved to said raised position while said lugs are in lateral engagement in response to rotational movement of said driving member in a predetermined direction.

5. A device for balancing a wheel, comprising
a wheel support member including a central portion defining a pivot member along the vertical axis of said wheel support member,
a base member including pedestal means for pivotally supporting said wheel support member in balancing fashion thereon by means of said pivot member,
a plurality of wheel support arms extending radially outwardly and sloping downwardly from said central portion and adapted to support a wheel thereon in concentric relation to said axis,
a plurality of threaded shaft members rotatably supported in parallel relation to said arms,
a plurality of jaw members in threaded engagement with said shaft members and respectively slidable on and supported by said arms independently of said shaft members whereby rotation of said shaft members causes said jaws to slide along said arms,
gear means mounted in said central portion and connected to said shafts for simultaneously rotating said shafts to move said jaws therealong, and
said arms having relatively smooth upper surfaces to permit said jaws to move said wheel into concentric relationship relative to said pivot member.

6. A device for balancing wheels as set forth in claim 5 wherein
said jaws are each provided with a pair of holes one above the other,
said arms respectively extending through the upper holes in said jaws, and
said threaded shaft members extending through the lower holes in said jaws, said lower holes being internally threaded.

References Cited
UNITED STATES PATENTS

| | | | |
|---|---|---|---|
| 815,988 | 3/1906 | Amber | 279—113 |
| 2,225,273 | 12/1940 | Jacobs. | |
| 2,270,657 | 1/1942 | Kraft | 73—484 |
| 2,679,751 | 6/1954 | Pfeiffer | 73—484 |
| 3,203,255 | 8/1965 | Rexroat | 73—484 |
| 3,335,611 | 8/1967 | Marshall | 73—484 |

JAMES J. GILL, Primary Examiner

UNITED STATES PATENT OFFICE
CERTIFICATE OF CORRECTION

Patent No. 3,517,558          Dated June 30, 1970

Inventor(s) WALTER P. KUSHMUK and LEO C. BOGAERTS

It is certified that error appears in the above-identified patent and that said Letters Patent are hereby corrected as shown below:

Column 8, line 42, claim 1, after "support" insert -- member in meshing engagement with said first --.

Signed and sealed this 18th day of May 1971.

(SEAL)
Attest:

EDWARD M. FLETCHER, JR.          WILLIAM E. SCHUYLER, JR.
Attesting Officer                Commissioner of Patents